United States Patent [19]

Bauerle

[11] Patent Number: 5,294,935
[45] Date of Patent: Mar. 15, 1994

[54] REMOTE RADAR PHASE CALIBRATOR

[75] Inventor: Donald G. Bauerle, Aberdeen, Md.

[73] Assignee: The United States of America as represented by the Secretary of the Army, Washington, D.C.

[21] Appl. No.: 23,838

[22] Filed: Feb. 23, 1993

[51] Int. Cl.$^5$ .............................................. G01S 7/40
[52] U.S. Cl. ......................................... 342/174; 342/7
[58] Field of Search ..................... 342/7, 165, 173, 174

[56] References Cited

U.S. PATENT DOCUMENTS 3,388,604  6/1968  McFarland et al. ............ 342/165 X

*Primary Examiner*—T. H. Tubbesing
*Attorney, Agent, or Firm*—Saul Elbaum; Frank J. Dynda

[57] ABSTRACT

A remote radar phase calibrator that provides radar phase measurement and calibration. A trihedral or dihedral reflector placed in the radars field of view provides an amplitude calibrated phase stable signal to the radar. Movement of the reflector head-on to the radar provides a phase angle measurement that varies as a function of the radars transmitted wavelength and the distance the reflector is moved.

7 Claims, 3 Drawing Sheets

REMOTE RADAR PHASE CALIBRATOR

RIGHTS OF THE GOVERNMENT

The invention described herein may be manufactured, used and licensed by or for the United States Government for Governmental purposes without payment to us of any royalty thereon.

BACKGROUND OF THE INVENTION

This invention relates to a radar phase measurement apparatus with a remote phase shifting element used for radar calibration.

Wide bandwidth coherent radars used in tracking systems, synthetic aperture measurement systems, and high range resolution systems measure relative phase differences at discrete frequencies between the transmitted and received signals. These differences are calibrated in terms of wavelength angle difference, which is referred to as phase angle. These phase measurements along with signal amplitude are transformed to the time domain via Fast Fourier Transforms (FFT), for range information. Range resolution R is inversely proportional to the number of discrete frequencies measured and the measurement bandwidth. High range resolution radars may require as much as 2,000 megahertz of bandwidth.

The phase delay through various components of the radar receiver varies as a function of the measurement frequency. The phase delay of the complete radar system must be calibrated at each measurement frequency across the receiver bandwidth.

Phase calibration is accomplished by measuring the radar phase angle output with a calibrated phase-shifted RF signal input.

In the prior art, phase shifting elements that are part of the radar system are used to vary the phase angle of a constant phase signal measured by or injected into the radar. This may be a waveguide phase shifter or a device at the radars intermediate frequency. Generally these devices shift the phase in increments of degrees, and the absolute accuracy is variable. These devices, especially the waveguide shifters, are inherently narrow band and the absolute accuracy degrades when they are used across a wide radio frequency (RF) bandwidth. The signal loss through component phase shifters may change as the phase angle is varied. This will introduce additional error in the overall absolute calibration of the radar system. Component phase shifters built into the radar system will introduce some additional losses that can degrade the overall sensitivity of the radar system. This will also introduce additional error in the overall absolute calibration of the radar system.

SUMMARY OF THE INVENTION

This invention relates to a device that allows phase calibration of a radar with the phase shifting element remote to the radar being calibrated. A trihedral or dihedral reflector placed in the radar's field of view, will provide an absolute amplitude calibrated phase stable signal to the radar. If the reflector is moved, in a direction head-on to the radar, the received phase angle will vary as a function of the radar's transmitted wavelength and the distance the reflector is moved. A movement of one wavelength will provide a 360 degree phase shift at the phase output of the radar.

This invention is a mechanism to provide a highly accurate, controlled movement of a radar reflector located remote to the radar system being measured or calibrated.

The reflector device is placed on a tripod or some other stable platform in the far field of the radar antenna. Precise radar phase calibration requires the linear motion of the reflector to be head-on to the radar antenna. This head-on alignment is set up by introducing right angle side movement to the reflector. The reflector device will be aligned properly in the azimuth plane when a right angle movement of the reflector produces no phase angle change at the radar output. Alignment in the vertical plane is accomplished with a simple leveling indicator. The complete device can be aligned and operated with a computer or a manual remote control.

Radar phase measurement or calibration is accomplished at discrete frequencies by moving the reflector in either direction, toward or away from the radar, while recording the radar output phase angle as a function of the reflector movement in terms of transmitted wavelength. This calibration procedure can be repeated for each discrete frequency required for operation.

BRIEF DESCRIPTION OF THE DRAWING

A better understanding of the invention will be obtained when the following detailed description of the invention is considered in connection with the accompanying drawing(s) in which.

DETAILED DESCRIPTION OF THE INVENTION

Figure 1:
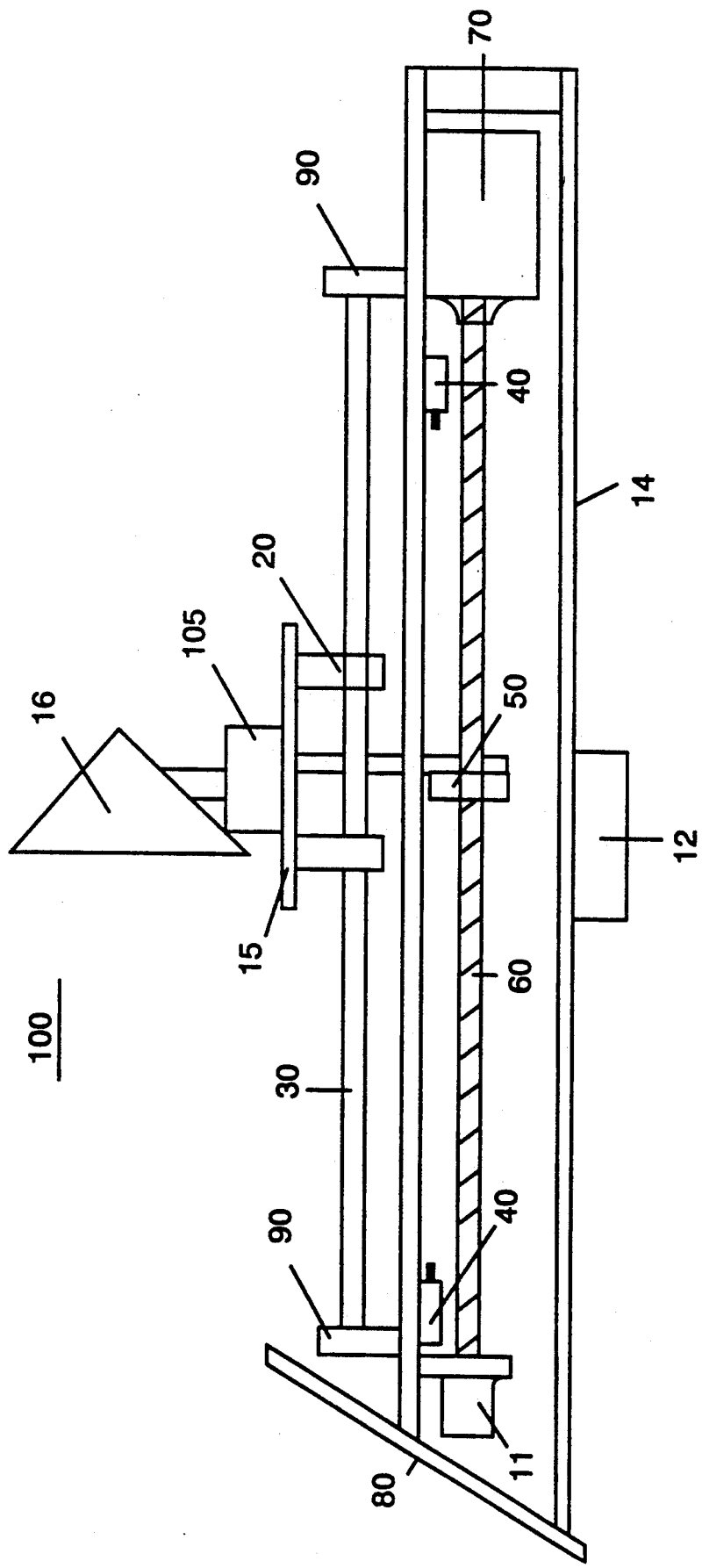
FIG. 1 is a side view of the radar remote phase calibrator.
Figure 2:
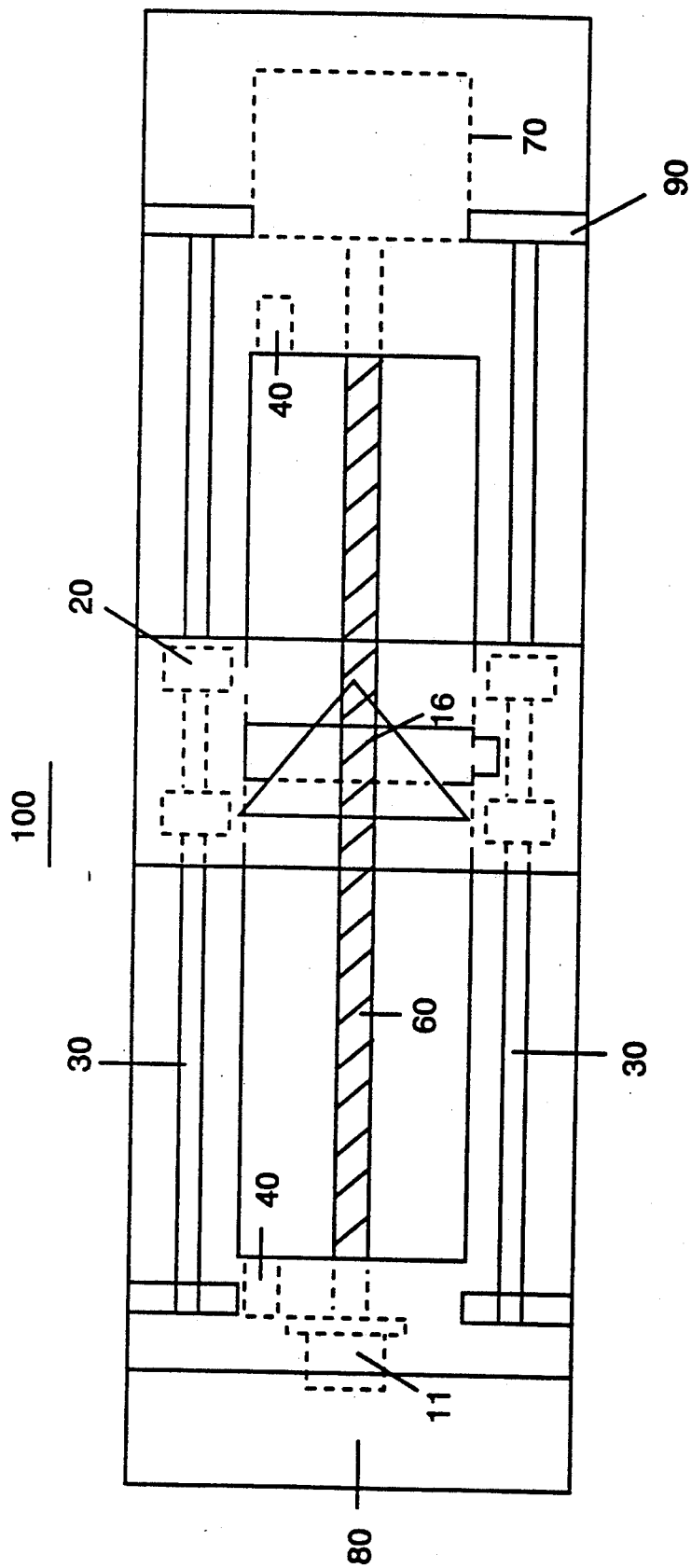
FIG. 2 is a top view of the radar remote phase calibrator.

Referring to FIGS. 1 and 2, the radar reflector 16 is rigidly mounted on a plate 15 that is attached to linear bearings 20, mounted on two shafts 30 supported by shaft supports 90. This complete remote phase calibrator structure 100 includes a flat mounting plate 14 which provides a precise linear movement of the reflector 16 along the shafts 30. The reflector 16 is driven by a precision linear actuator 50 and a threaded rod 60. Linear movement is accomplished by rotating the rod 60 with a variable speed motor or stepping motor 70. Linear motion is measured with an optical or synchronous angle encoder 11. Micro-switches 40 are located on both ends of the rod 60 to reverse the direction of movement. A forward scattering plate 80 is mounted in front of the complete structure 100 so that only the reflector 16 can be seen by the radar 101, shown in FIG. 3. A right angle screw adjustment 105, moves the reflector 16 from side to side for initial setup. A tripod mounting plate 12 is provided to secure the complete structure 100 to a tripod or other suitable similar device.

Figure 3:
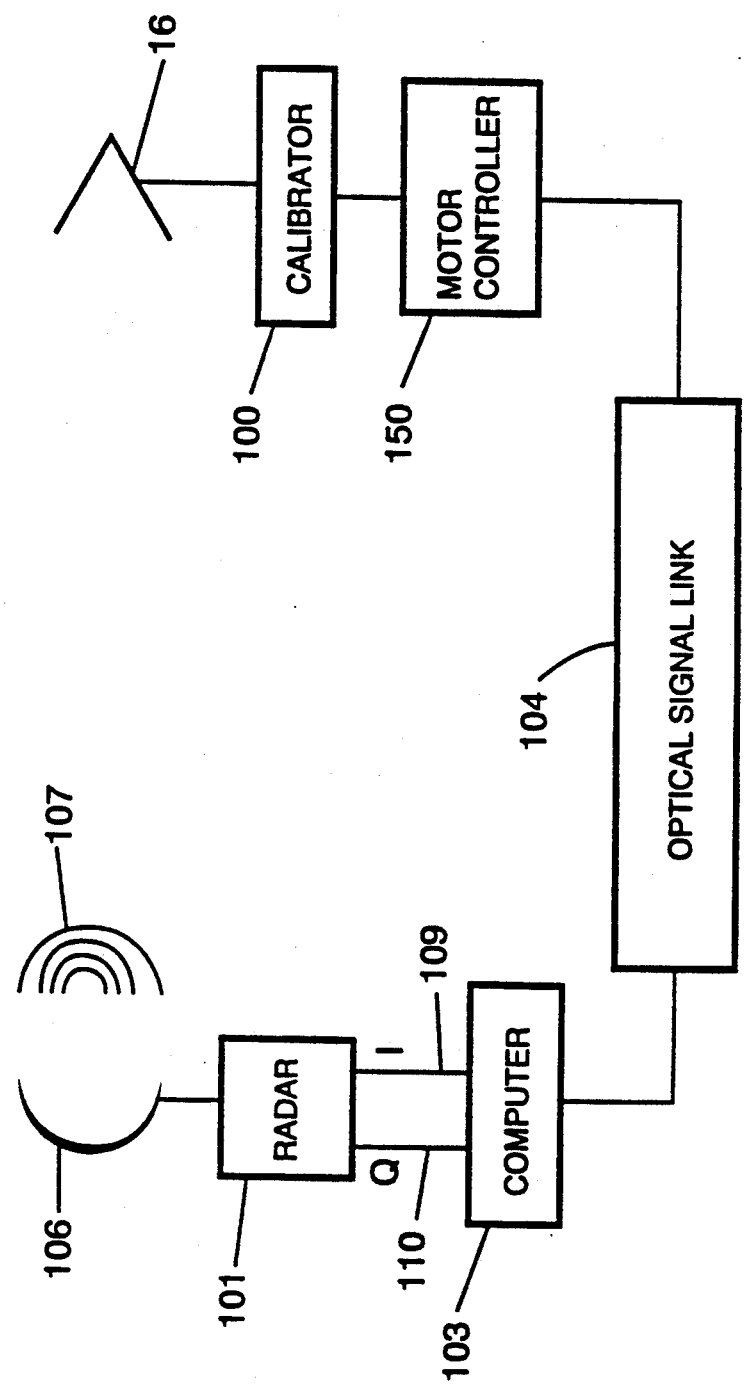
FIG. 3 is a block diagram of a remote radar phase calibration test setup.

Referring to FIG. 3, a phase coherent radar system 101 under test is set up so that the antenna beam 107 illuminates the remote phase calibrator 100. The remote phase calibrator 100 is set in the far field of the antenna 106 at an elevation that will eliminate multipath effects. A computer system 103, for example a Hewlett Packard series 9000-300 with a series 6900 multiprogrammer is set up to control the radar 101, and the remote phase calibrator 100, and the computer system 103, also measures and records the I 109 and Q 110 phase outputs of the radar 101. An optical signal link 104, for example a Hewlett Packard HPLB, is set up to control a Hewlett Packard motor controller 150, that operates the stepping motor 70. This optical link 104 also measures the position of the reflector 16.

The remote phase calibrator 100 is set up so that it is exactly head-on to the antenna beam 107. The lateral adjustment of the reflector 16 is changed while observing the I 109 or Q 110 outputs of the radar 101. The remote phase calibrator is in proper alignment when a lateral adjustment of the reflector 16 produces no measured change of phase angle. The exact I and Q phase outputs can now be measured and recorded as a function of the measurement transmitted frequencies. This information is used to set up a file which is used to correct for any changes in phase introduced by parts of the radar under test. The radar transmitting frequency can remain constant and the reflector 16 moved through measured increments of a transmitted wavelength, or the reflector 16 can be set up at various increments of a wavelength while the transmitted frequency is stepped or swept across the operational frequency range.

Having described this invention, it should be apparent to one skilled in the art that the particular elements of this invention may be changed, without departing from its inventive concept. This invention should not be restricted to its disclosed embodiment but rather should be viewed by the intent and scope of the following claims.

What is claimed is:

1. A remote radar phase calibrator system comprising:
    antenna means connected to a radar system under test for illuminating a reflector,
    computer means connected to said radar system for measuring and recording I and Q phase outputs of said radar system,
    translational means for moving said reflector a controlled distance with respect to said antenna,
    controller means connected to said translational means for operating said translational means,
    optical signal link means connected to said controller means and said computer means for controlling said translational means, wherein said I and Q phase outputs are recorded for various positions of said reflector with respect to said antenna means thereby calibrating said radar system under test.

2. A remote radar phase calibrator as in claim 1 wherein said means for supporting said movable platform further comprises:
    linear bearing means attached to said movable platform,
    a linear rotational actuator rotatable affixed to said linear bearing means,
    motor means connected to said linear rotational actuator for rotating said linear rotational actuator,
    wherein rotation of said linear rotational actuator produces motion of said reflector toward or away from said radar antenna.

3. A remote radar phase calibrator as in claim 2 wherein said motor means connected to said linear rotational actuator comprises a stepping motor.

4. A remote radar phase calibrator as in claim 2 wherein said reflector is a bihedral or dihedral reflector.

5. A remote radar phase calibrator as in claim 1 wherein said means for supporting said movable platform further comprises means for lateral motion of said reflector with respect to said antenna.

6. A remote radar phase calibrator as in claim 1 wherein said means for supporting said movable platform includes a tripod mount.

7. A remote radar phase calibrator as in claim 1 wherein said means for supporting said movable platform includes a forward scattering plate facing said antenna.

* * * * *